(12) United States Patent
Campbell

(10) Patent No.: US 6,317,310 B1
(45) Date of Patent: Nov. 13, 2001

(54) APPARATUS AND METHOD FOR GENERATING THRUST USING A TWO DIMENSIONAL, ASYMMETRICAL CAPACITOR MODULE

(75) Inventor: Jonathan W. Campbell, Harvest, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/520,817

(22) Filed: Mar. 8, 2000

(51) Int. Cl.⁷ .............................. H01G 4/228; H05K 7/02

(52) U.S. Cl. ........................................ 361/306.1; 361/811

(58) Field of Search ................... 361/306.1, 15, 361/16, 17, 715, 821, 311

(56) References Cited

U.S. PATENT DOCUMENTS 4,392,179 * 7/1983 Nelson et al. ................. 361/234

* cited by examiner

Primary Examiner—Anthony Dinkins
(74) Attorney, Agent, or Firm—James J. McGroary

(57) ABSTRACT

A capacitor module system is provided for creating a thrust force. The system includes a capacitor module provided with a first conductive element having a cylindrical geometry. The first conductive element can be a hollow cylinder or a solid cylinder. The capacitor module also includes a second conductive element axially spaced from the first conductive element and of smaller axial extent. The second conductive element can be a flat disk, a dome, or a conductive tip at the end of a dielectric rod. A dielectric element is disposed between the first conductive element and the second conductive element. The system also includes a high voltage source having first and second terminals connected respectively to the first and second conductive elements. The high voltage source applies a high voltage to the conductive elements of sufficient value to create a thrust force on the module inducing movement thereof.

10 Claims, 3 Drawing Sheets

APPARATUS AND METHOD FOR GENERATING THRUST USING A TWO DIMENSIONAL, ASYMMETRICAL CAPACITOR MODULE

ORIGIN OF THE INVENTION

This invention was made by an employee of the United States Government and may be manufactured and used by or for the Government for Governmental purposes without the payment of royalties.

BACKGROUND OF THE INVENTION

1. Field of Invention

The present invention relates to methods and apparatus which use capacitors charged to high potentials for generating thrust and, more particularly, to an improved method and apparatus using a two dimensional, asymmetrical capacitor to which a high potential is applied.

2. Background of the Invention

It is well established in the literature, that a force or thrust may be generated by a capacitor charged to a high potential. Although there are different theories regarding the basis for this phenomenon, there is no dispute that a force is generated by capacitors under such high voltages. However, the thrust generated by such high potential capacitors has been minimal and thus this phenomenon has had very limited practical utility.

SUMMARY OF THE INVENTION

In accordance with the invention, an apparatus and method are provided for creating a thrust from a capacitor module system.

In accordance with a first aspect of the invention, a capacitor module system is provided for creating a thrust, said system comprising a capacitor module comprising a first conductive element having a cylindrical geometry; a second conductive element axially spaced from the first conductive element; and of a geometry having a smaller axial extent than the first conductive element; and a dielectric element disposed between the first conductive element and the second conductive element so as to form the capacitor module; and, a high voltage source, having first and second terminals connected respectively to the first and second conductive elements, for applying a high voltage to the conductive elements of sufficient value to create a thrust force on said module inducing movement thereof. The first conductive element can comprise a solid cylinder or a hollow cylinder. The second conductive element can comprise a disk, a domed element, or a tip at the end of a dielectric rod. The system may further include a plurality of circumferentially disposed, spaced dielectric rods interconnect the dielectric element and the second conductive element.

In accordance with a further aspect of the invention, an apparatus is provided for creating rotary motion, said apparatus comprising a rotor; a drive shaft driven by said rotor; and at least one capacitor module mounted on the rotor for imparting a thrust force to the rotor to cause rotation thereof, said capacitor module comprising a first conductive element having a cylindrical geometry; a second conductive element axially spaced from the first conductive element and having a geometry of smaller axial extent than the first conductive element; a dielectric element disposed between the first conductive element and the second conductive element so as to form the capacitor module; and at least one high voltage source, having first and second terminals connected respectively to the first and second conductive elements of the at least one capacitor module, for applying a high voltage to the conductive elements of sufficient value to the thrust force.

Advantageously, the rotor may include at least two blades and a capacitor module is mounted on each of the blades.

In accordance with yet another aspect of the invention, a linear accelerator is provided, the accelerator comprising a support rail; a capacitor module comprising a first conductive element having a cylindrical geometry and a first sliding electrical contact; a second conductive element axially spaced from the first conductive element and of a geometry of smaller axial extent than the first conductive element and having a second sliding electrical contact; and a dielectric element disposed between the first conductive element and the second conductive element so as to form the capacitor module; a frictionless connection for connecting said capacitor module to the support rail for movement therealong; and a high voltage source, having first and second terminals connected respectively to the first and second sliding electrical contacts, for applying a high voltage to the conductive elements of sufficient value to create a thrust force on the module inducing movement thereof along the support rail.

Further features and advantages of the present invention will be set forth in, or apparent from, the detailed description of preferred embodiments thereof which follows.

BRIEF DESCRIPTION OF THE DRAWINGS

FIG. 1 (a) is an end elevation view of the asymmetrical capacitor module shown in FIG. 1;

DESCRIPTION OF THE PREFERRED EMBODIMENTS

Figure 1:
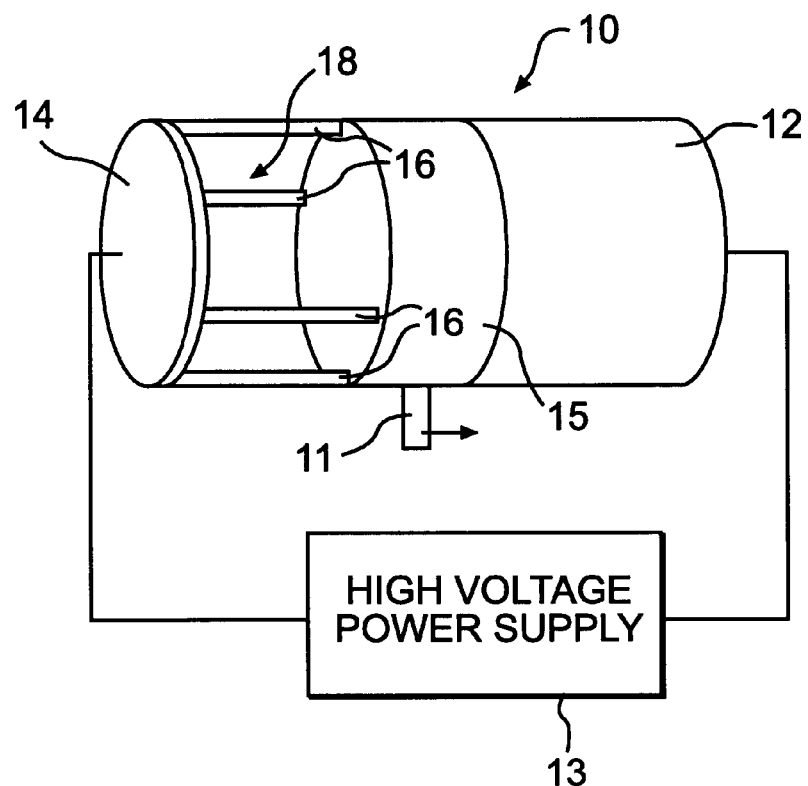
FIG. 1 is a perspective view of an asymmetrical capacitor module in accordance with a first embodiment of the invention.
Figure 1A:
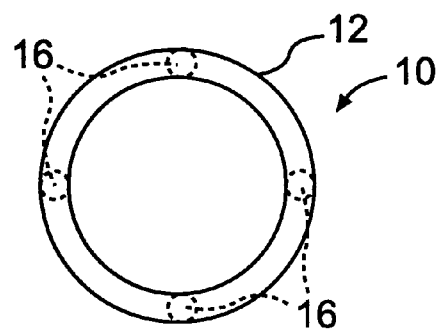

Referring to FIG. 1, there is shown a perspective view of a two dimensional, asymmetrical capacitor module 10 in accordance with a first embodiment. The capacitor module 10 includes, at one end thereof, a cylinder 12 made of copper or another highly conductive material. The cylinder 12 can be solid or hollow as shown in FIG. 1(a). The module 10 also includes, axially spaced from cylinder 12 at the other end of module 10, a cylindrical disk 14 made of copper or another highly conductive material. In the embodiment of FIG. 1, a cylindrical dielectric element 15, which is made of Kapton or another high voltage dielectric material, is affixed to cylinder 12 on the side of cylinder 12 closest to the cylindrical disk 14. A plurality of dielectric rods or struts 16 are provided which join the disk 14 and the dielectric cylinder 15. The dielectric rods 16 are attached, at one end thereof, about the periphery of the dielectric cylinder 15. These dielectric rods 16 extend axially across the air gap 18 and are attached, at the other end thereof, to the disk 14. A support post 11 extends outwardly from the cylindrical dielectric element 15. Support post 11 is preferably made of Kapton or another high voltage dielectric substance.

A high voltage supply 13 is also provided. The high voltage supply 13 has first and second terminals respectively connected to the cylindrical disk 14 and the cylinder 12 which form the axial capacitor plates of the capacitor module 10. The voltage of the voltage supply 13 is such to charge the capacitor module 10 to a sufficiently high potential to cause a thrust or force to be generated which causes axial movement of the capacitor module 10.

Figure 2:
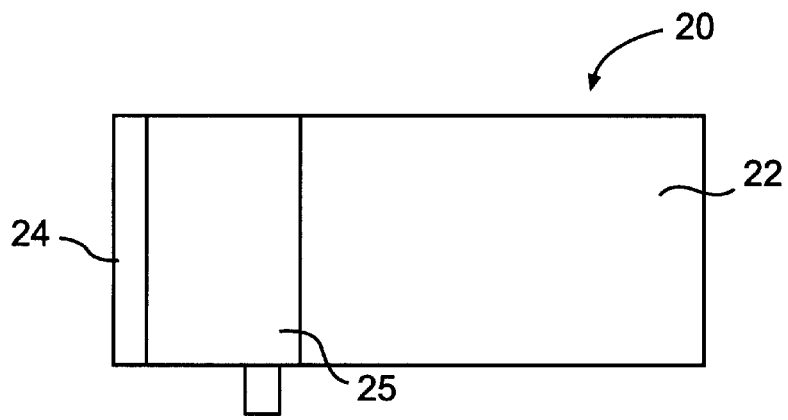
FIG. 2 is a side elevation view of an asymmetrical capacitor module in accordance with a further embodiment of the invention.

The embodiment of FIG. 2 is similar to that of FIG. 1 and corresponding elements have been given the same reference numerals with a "2" replacing the "1" in the tens place. Referring to FIG. 2, the module depicted, which is generally denoted 20, differs from that of FIG. 1 in that a simple cylindrical dielectric element 25 is positioned between conductive cylinder 22 and disk 24, instead of the cylindrical dielectric cylinder 15 and dielectric rods 16 employed in the embodiment of FIG. 1.

Figure 3:
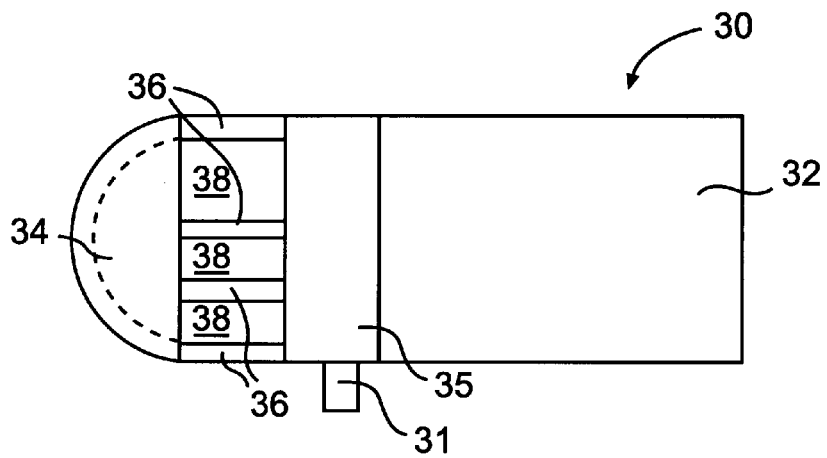
FIG. 3 is a side elevation view of an asymmetrical capacitor module with a domed capacitor plate.

The embodiment of FIG. 3 is similar to that of FIG. 1 and corresponding elements have been given the same reference numerals with a "3" replacing the "1" in the tens place. Referring to FIG. 3, the module depicted, which is generally denoted 30, differs from that of FIG. 1 in that a cap or domed conductive element 34 forms the other side of the capacitor module 30 instead of the cylindrical disk 14 depicted in FIG. 1.

Figure 4:
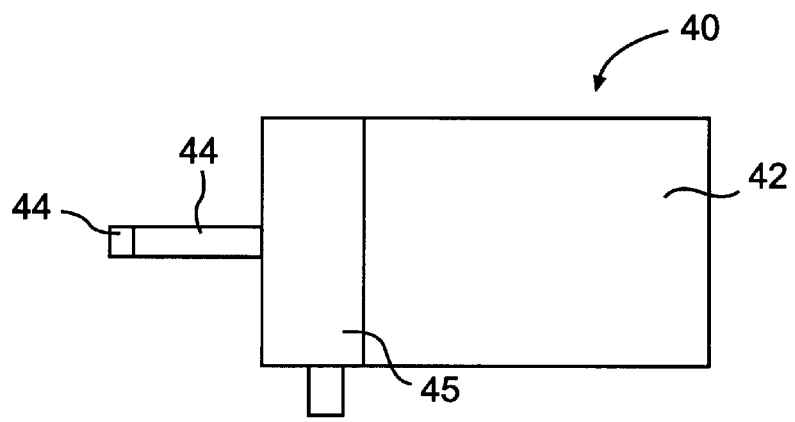
FIG. 4 is a side elevation view of an asymmetrical capacitor module with a tip capacitor plate in accordance with yet another embodiment of the invention.

The embodiment of FIG. 4 is similar to that of FIG. 1 and corresponding elements have been given the same reference numerals with a "4" replacing the "1" in the tens place. Referring to FIG. 4, the module depicted, which is generally denoted 40, differs from that of FIG. 1 in two ways. A tip element 44 forms the other end, i.e., the other plate, of the capacitor module 40 instead of the cylindrical disk 14 depicted in FIG. 1. Additionally, the tip element 44 is supported by a single dielectric rod 46 extending axially from the center of the dielectric cylinder 45.

Figure 5:
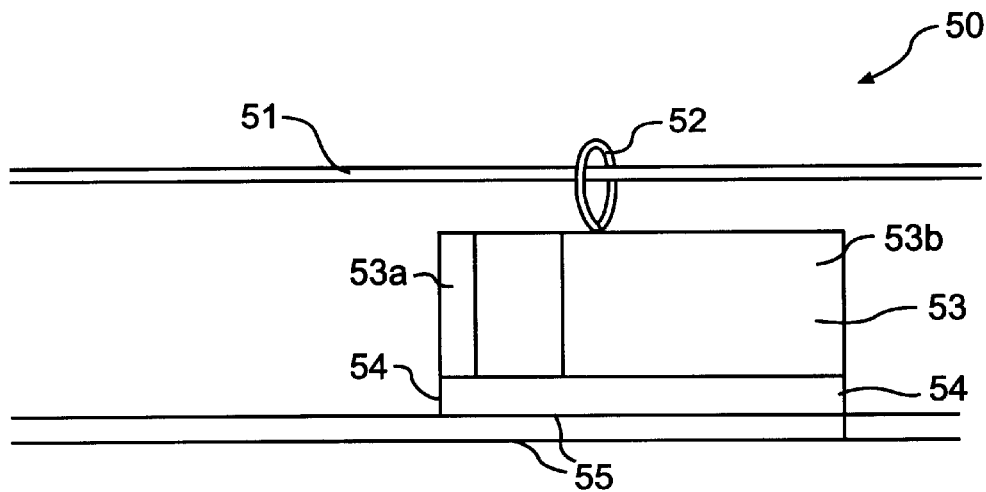
FIG. 5 is a side elevation view of a linear accelerator powered by an asymmetrical capacitor module according to the invention.

FIG. 5 shows a potential application for two dimensional, asymmetrical capacitor modules of the invention. FIG. 5 depicts a linear accelerator 50 which can be used to launch payloads or other similar applications. A two dimensional, asymmetrical capacitor module 53, which includes capacitor plates 53a and 53b and which is of the type shown in FIG. 2 but could be of any type, is attached to a non-conductive support rail 51 by a frictionless coupling 52. A pair of conductive leads 55 provide the required high potential to the module 53, i.e., supply a high voltage to the capacitor plates 53a and 53b of capacitor module 53. The high voltage provided by the conductive leads 55 is applied to the plates 53a and 53b of the module 53 by respective sliding contacts 54.

Figure 6:
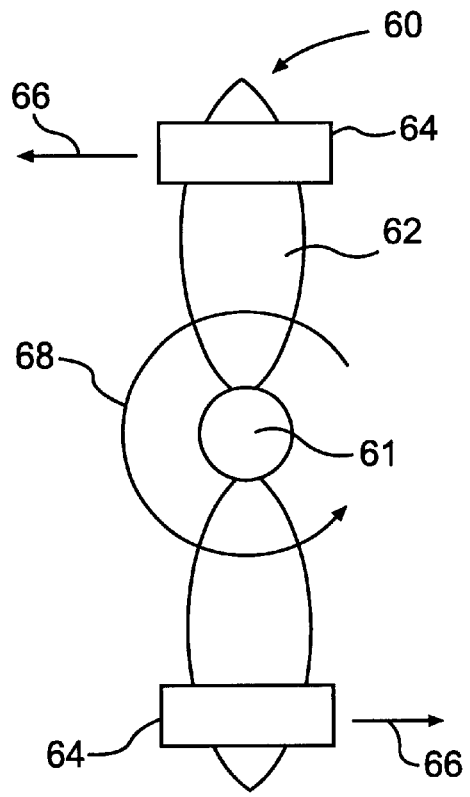
FIG. 6 is an end elevation view of a propeller driven by an asymmetrical capacitor modules according to the invention.

Referring to FIG. 6, there is shown another potential application for the two dimensional, asymmetrical capacitor modules of the invention. In this application, capacitor modules 64 are attached to the ends of propeller or other rotor 62. When a high potential is applied to the capacitor modules 64 the modules 64 create a thrust in the direction indicated by arrows 66. This imparts a torque, indicated by arrow 68, on the shaft 61 of propeller 62. This application would work equally well for any shaft driven application. It will be appreciated that the two dimensional, asymmetrical capacitor modules 64 are of the same construction as described above in connection with FIGS. 1 to 4 and thus would include a first conductive element having a cylindrical geometry (not shown but corresponding, e.g., to cylinder 12 of FIG. 1) and a second conductive element axially spaced from the first conductive element and having a smaller axial extent than the first element (not shown but corresponding, e.g., to cylindrical disk 14 of FIG. 1), a dielectric element disposed between the first and second conductive elements (not shown but corresponding, e.g., to dielectric element 15 of FIG. 1) and a high voltage source including terminals connected to the conductive elements (not shown but corresponding, e.g., to high voltage supply 13 of FIG. 1).

Although the invention has been described above in relation to preferred embodiments thereof, it will be understood by those skilled in the art that variations and modifications can be effected in these preferred embodiments without departing from the scope and spirit of the invention.

What is claimed is:

1. A capacitor module system for creating a thrust, said system comprising:

a capacitor module comprising a first conductive element having a cylindrical geometry;

a second conductive element axially spaced from said first conductive element and having a geometry of smaller axial extent than said first conductive element; and a dielectric element disposed between said first conductive element and said second conductive element so as to form the capacitor module; and, a high voltage source, having first and second terminals connected respectively to said first and second conductive elements, for applying a high voltage to said conductive elements of sufficient value to create a thrust force on said module inducing movement thereof.

2. The apparatus of claim 1 wherein the first conductive element comprises a solid cylinder.

3. The apparatus of claim 1 wherein the first conductive element comprises a hollow cylinder.

4. The apparatus of claim 1 wherein the second conductive element comprises a disk.

5. The apparatus of claim 1 wherein the second conductive element is dome shaped.

6. The apparatus of claim 1 wherein the dielectric element comprises a rod and the second conductive element comprises a conductive tip on said rod.

7. The apparatus of claim 1 wherein a plurality of circumferentially disposed, spaced dielectric rods interconnect the dielectric element and the second conductive element.

8. A rotary apparatus comprising:

a rotor;

a drive shaft driven by said rotor; and at least one capacitor module mounted on said rotor for imparting a thrust force to said rotor to cause rotation thereof, said capacitor module comprising a first conductive element having a cylindrical geometry; a second conductive element axially spaced from said first conductive element and having a geometry of smaller axial extent than said first conductive element; a dielectric element disposed between said first conductive element and said second conductive element so as to form the capacitor module; and at least one high voltage source, having first and second terminals connected respectively to said first and second conductive elements of said at least one capacitor module, for applying a high voltage to said conductive elements of sufficient value to create a thrust force on said module inducing movement thereof.

9. The apparatus of claim 8, wherein said rotor includes at least two blades and a said capacitor module is mounted on each of said blades.

10. A linear accelerator, comprising:

a support rail;

a capacitor module comprising a first conductive element having a cylindrical geometry and a first sliding electrical contact; a second conductive element axially spaced from said first conductive element and of a geometry of smaller axial extent than the first conductive element and having a second sliding electrical contact; and a dielectric element disposed between said first conductive element and said second conductive element so as to form the capacitor module;

a frictionless connection for connecting said capacitor module to said support rail for movement therealong; and a high voltage source, having first and second terminals connected respectively to said first and second sliding electrical contacts, for applying a high voltage to said conductive elements of sufficient value to create a thrust force on said module inducing movement thereof along the support rail.

* * * * *